Patented Dec. 18, 1923.

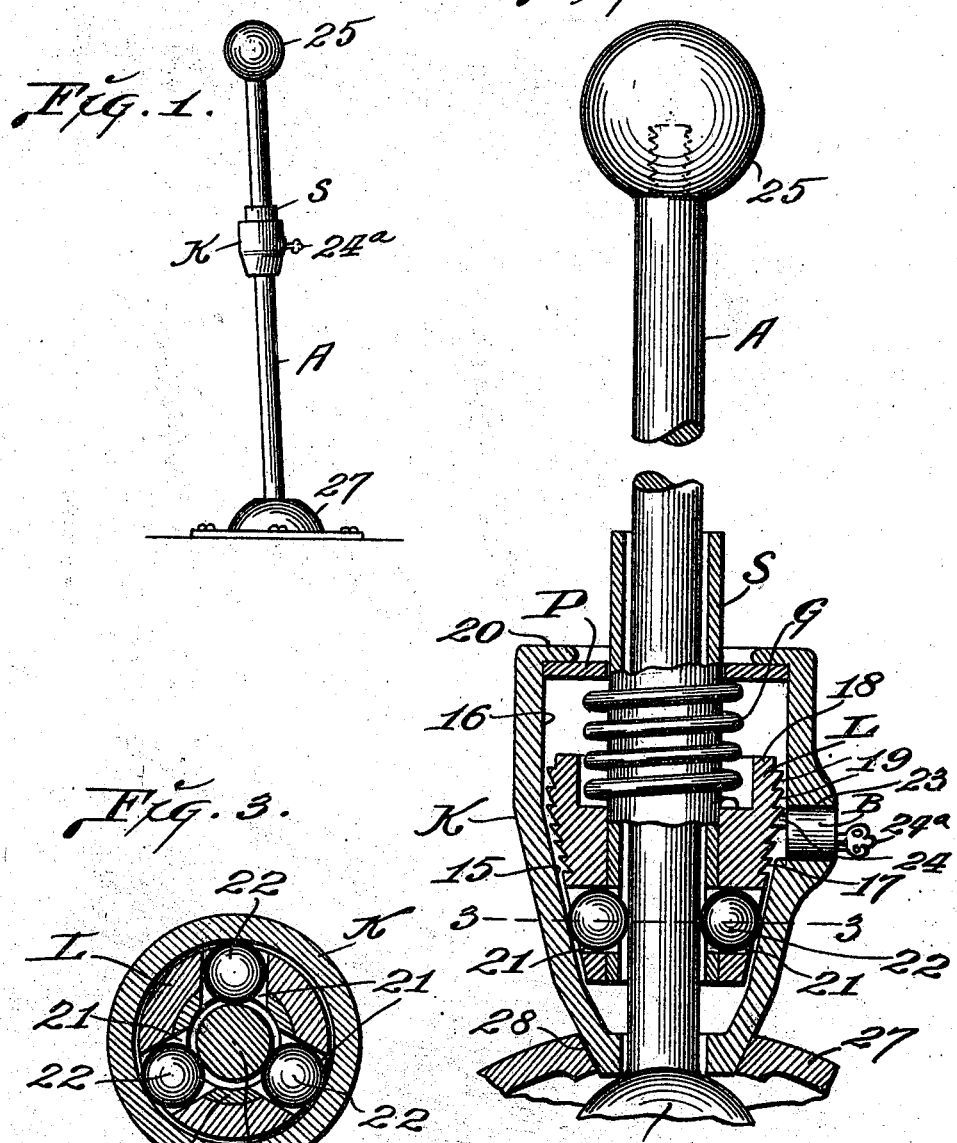

1,478,275

UNITED STATES PATENT OFFICE.

WRIGHT CONKLIN AND WALTER WISSINGER, OF LOS ANGELES, CALIFORNIA.

AUTOMOBILE LOCK.

Application filed March 1, 1922. Serial No. 540,266.

*To all whom it may concern:*

Be it known that we, WRIGHT CONKLIN and WALTER WISSINGER, citizens of the United States, residing at Los Angeles, in the county of Los Angeles and State of California, have invented new and useful Improvements in Automobile Locks, of which the following is a specification.

Our invention relates generally to automobile locks and more particularly to that type of lock adapted for effecting the locking of the gear shifting lever in any predetermined position to prevent the surreptitious use of an automobile.

A purpose of our invention is the provision of a lock for gear shifting levers which is of extremely simple, durable and efficient construction and which when in applied position upon a lever effectively secures the lever in neutral or in gear meshing position.

It is also a purpose of our invention to provide a lock of the above described character which can be applied to a gear shifting lever without in any way modifying the construction of the latter, and which is capable of being moved to an inactive position in which the normal operation of the lever is in no way hampered.

Although we will describe only one form of automobile lock embodying our invention and point out the novel features thereof in claims, it is to be understood that various changes and modifications may be made herein without departing from the spirit and scope of such claims.

In the accompanying drawings,

Figure 1 is a view showing in side elevation a gear shifting lever of the ball and socket type and having applied thereto one form of lock embodying our invention.

Fig. 2 is a view similar to Fig. 1 with the lock embodying our invention in active position and shown in section.

Fig. 3 is a transverse sectional view taken on the line 3—3 of Fig. 2.

Fig. 4 is a fragmentary view showing in side elevation a modified form of lock embodying our invention.

Referring specifically to the drawings in which similar reference characters refer to similar parts, our invention, in its present embodiment, comprises a casing designated at K formed of relatively heavy metal and in such manner as to provide a tapered bore 15 and a uniform circular bore 16. The opposite ends of the casing K are formed with suitable openings adapted to receive a gear shifting lever so as to permit of the locking device occupying an active position as shown in Fig. 2, or an inactive position as shown in Fig. 1. Within the casing K is mounted a sleeve S, and secured to this sleeve is a locking collar L of tapered cross section and provided on its periphery with upwardly extending teeth 17. The upper end of the collar L is provided with an annular flange 18 also provided with teeth 19. The flange 18 is spaced from the bore of the collar L so as to accommodate a coil expansible spring G which is shown as surrounding the sleeve S at a point within the casing K. The upper end of the spring G abuts a plate P mounted within the casing K and secured therein against displacement by means of an annular flange 20 formed on the upper end of the casing K by bending the latter inwardly.

As clearly shown in Figs. 2 and 3, the collar L and the sleeve S are formed with openings 21 at corresponding points adjacent their lower ends, and loosely mounted in these openings are balls 22 of such a diameter as to have engagement with the gear shifting lever and the inner wall of the casing K for effecting a locking of the collar L when the latter is in any desired position.

A barrel lock B of conventional form is mounted within a socket 23 formed in a relatively thick portion of the casing K and provided with a locking bolt 24 which is adapted to engage any of the teeth 17 or 19 for locking the collar and consequently the sleeve against movement within the casing. A key 24ᵃ is shown within the lock and is adapted to actuate the same in effecting a projection or retraction of the bolt 24.

In the applied position of the lock as shown in Fig. 2, the gear shifting lever designated at A is extended through the sleeve S and casing K, it being understood that the head 25 of the lever is detached when applying the lock to the lever. The lever A is of the ball and socket type, that is its lower end is formed with a ball 26 adapted to fit in a socket 27, with the shank of the lever extended through an opening 28 formed in the socket 27.

In operation, the lock normally occupies an elevated or inactive position as shown in Fig. 1, but when it is desired to lock the lever A against lateral movement, the lock is slid downwardly on the lever to the position shown in Fig. 2 wherein the nose or lower end of the casing is disposed within the opening 28 of the socket 27 thereby preventing lateral movement of the lever. The spring G normally functions to urge the collar L and consequently the sleeve S downwardly within the casing K, and because of the contour of the collar and casing, it will be clear that the distance between the lever and the casing will be constricted to cause the balls 22 to grip the lever and casing in preventing upward movement of the casing on the lever. Movement of the collar L upwardly on the lever is prevented by actuating the lock B to project the bolt 24 to engage the teeth of the collar thereby positively preventing removal of the nose of the casing from the opening 28.

When it is desired to release the lever A, the locking bolt 24 is retracted so that the collar L can be moved upwardly against the tension of the spring G to cause the balls 22 to move to a released position by pulling upwardly upon the sleeve S and at the same time holding the casing K against upward movement. When the balls are in released position it will be clear that the entire lock may be slid upwardly upon the lever A so that such lever is again free to perform the functions for which it is intended. It is to be particularly noted that the sleeve S is formed of relatively thin metal so that should the release of the collar L be attempted by applying a wrench to the sleeve, it will be distorted and bent so as to preclude the possibility of the wrench lifting the sleeve.

What we claim is:

1. In combination, a stationary member, a gear shifting lever extending into the member and mounted for lateral movement, means slidable upon the lever to occupy an active position in which it engages within the member for preventing lateral movement of the lever and an inactive position in which it is removed from the member to allow lateral movement of the lever, means frictionally engaging the lever for maintaining the first means in either of said positions, and means engageable with the last means for locking the first means in the active position.

2. A lock of the character described comprising a casing of conical form provided with openings adapted to slidably receive a gear shifting lever, a conical member movable within the casing, clutch members operable by the conical member adapted to secure said member to the gear shifting lever, means for urging the conical member to a position in which the clutch members are in gripping position with respect to said lever, and means for locking the conical member in said position.

3. A lock of the character described comprising a conical casing, a sleeve movable within the casing and having a portion thereof projecting from the casing, a conical member fixed to said sleeve within the casing, clutch members carried by the sleeve and conical member, a spring for urging the conical member to a position in which said clutch members are adapted to grip, a lever extending through the casing, teeth formed on the conical member, and a lock mounted in the casing and including a locking bolt adapted to engage said teeth for securing the member in the urged position.

4. A lock of the character described comprising a casing adapted for sliding movement upon a lever, a friction clutch within the casing adapted to grip said lever, means for urging the clutch to gripping position, and means for locking the clutch in gripping position.

5. A lock of the character described comprising a casing having a conical portion and through which a gear shifting lever is adapted to loosely extend, a conical member movable within the casing, a sleeve fixed to said member and having a portion thereof projecting from the casing, balls carried by said sleeve and member adapted to be constricted when the member is moved inwardly of the conical portion of said casing, a spring within the casing for urging the member to a position in which the balls are constricted, teeth formed in the member, and a lock carried by the casing and engaging said teeth for securing the member in urged position.

6. A lock of the character described comprising a casing adapted to slidably receive a gear shifting lever, a member movable within the casing, clutch members operable by the movable member adapted to secure said member to the gear shifting lever, means for urging the movable member to a position in which the clutch members are in gripping position with respect to said lever, and means for locking the movable member in said position.

7. A lock of the character described comprising a casing, a sleeve movable within the casing and having a portion thereof projecting from the casing, a member fixed to said sleeve within the casing, clutch members carried by the sleeve and member, a spring for urging the member to a position in which said clutch members are adapted to grip, a lever extending through the casing, teeth formed on the member, and a lock mounted in the casing and including a locking bolt adapted to engage said teeth for securing the member in the urged position.

8. A lock of the character described comprising a member adapted for slidable mounting on a lever to engage the socket for the lever to prevent lateral movement of the lever, means operating to allow unrestricted movement of the member downwardly on the lever and to automatically grip the lever and member when the member is in engaging position with respect to the lever socket, and means for locking said means in gripping position with respect to the lever and member to prevent disengagement of the lock from the lever socket.

In testimony whereof we have signed our names to this specification.

WRIGHT CONKLIN.
WALTER WISSINGER.